(12) United States Patent
McCoy et al.

(10) Patent No.: US 8,186,702 B2
(45) Date of Patent: May 29, 2012

(54) APPARATUS AND METHODS FOR WEIGHT DISTRIBUTION AND SWAY CONTROL

(75) Inventors: Richard W. McCoy, Granger, IN (US); Michael A. Hoopes, White Pigeon, MI (US)

(73) Assignee: Cequent Trailer Products Inc., Mosinee, WI (US)

( * ) Notice: Subject to any disclaimer, the term of this patent is extended or adjusted under 35 U.S.C. 154(b) by 58 days.

(21) Appl. No.: 11/977,083

(22) Filed: Oct. 23, 2007

(65) Prior Publication Data

US 2008/0143078 A1    Jun. 19, 2008

Related U.S. Application Data

(60) Provisional application No. 60/853,626, filed on Oct. 23, 2006.

(51) Int. Cl.
*B60P 3/12* (2006.01)
(52) U.S. Cl. ............... 280/406.1; 280/406.2; 280/455.1; 280/407; 280/456.1
(58) Field of Classification Search ............... 280/406.2, 280/455.1, 405.1, 406.1, 407, 456.1
See application file for complete search history.

(56) References Cited

U.S. PATENT DOCUMENTS

| | | | |
|---|---|---|---|
| 2,719,604 A | 5/1955 | Hartman | |
| 2,738,206 A | 3/1956 | Loughner | |
| 2,783,775 A | 3/1957 | Fullwood | |
| 2,789,834 A | 4/1957 | Chism | |
| 2,952,475 A | 9/1960 | Reese | |
| 3,151,879 A | 10/1964 | Bock | |
| 3,185,499 A | 5/1965 | Reese | |
| 3,194,584 A | 7/1965 | Reese | |
| 3,206,224 A * | 9/1965 | Bock et al. | 280/406.2 |
| 3,220,749 A | 11/1965 | Mathisen | |
| 3,226,999 A | 1/1966 | Allison | |
| 3,294,421 A | 12/1966 | Mathisen | |
| 3,359,824 A | 12/1967 | Focht | |
| 3,420,549 A | 1/1969 | Robinson | |
| 3,441,291 A | 4/1969 | Morris, Jr. | |
| 3,482,856 A | 12/1969 | Reese | |
| 3,482,859 A | 12/1969 | Bowlin | |
| 3,542,395 A | 11/1970 | Millikan | |
| 3,552,771 A * | 1/1971 | Hendricks | 280/406.2 |
| 3,600,004 A | 8/1971 | Newkirk | |
| 3,649,046 A | 3/1972 | Mathisen | |
| 3,655,221 A | 4/1972 | Warner | |
| 3,679,231 A | 7/1972 | Derr, Jr. | |
| 3,717,364 A | 2/1973 | McClive | |
| 3,731,950 A * | 5/1973 | Burcham | 280/406.2 |
| 3,778,088 A | 12/1973 | Alexander | |
| 3,779,407 A * | 12/1973 | Gillem | 414/563 |
| 3,784,036 A | 1/1974 | Gjoerloff | |
| 3,785,680 A | 1/1974 | Good et al. | |
| 3,787,069 A | 1/1974 | Chauncey | |
| 3,861,717 A | 1/1975 | Knox | |

(Continued)

*Primary Examiner* — Tony H. Winner
*Assistant Examiner* — Jacob Knutson
(74) *Attorney, Agent, or Firm* — McDonald Hopkins LLC

(57) ABSTRACT

The present invention is directed to apparatus, systems, and methods for distributing the weight of a trailer to a towing vehicle and controlling the sway of that trailer relative to the towing vehicle. An embodiment of the present invention includes a spring arm coupled to the towing vehicle and an attachment mechanism for selectively placing the spring arm in mechanical communication with the trailer. The attachment mechanism includes a bracket assembly reversibly attachable to the trailer; a shoe bracket reversibly attachable to the bracket assembly; and a friction pad coupled to the shoe bracket.

18 Claims, 14 Drawing Sheets

U.S. PATENT DOCUMENTS

| | | |
|---|---|---|
| 4,033,601 A | 7/1977 | Lindahl et al. |
| 4,049,288 A | 9/1977 | Young |
| 4,053,174 A | 10/1977 | Guettler, Jr. |
| 4,092,035 A | 5/1978 | Warner |
| 4,154,454 A | 5/1979 | Lewin |
| 4,165,885 A | 8/1979 | Good et al. |
| 4,211,427 A | 7/1980 | Young et al. |
| 4,230,333 A | 10/1980 | Persyn |
| 4,405,147 A | 9/1983 | Horsman et al. |
| 4,614,353 A | 9/1986 | Mayer |
| 4,679,812 A | 7/1987 | Byrnes |
| 4,722,542 A | 2/1988 | Hensley |
| 4,792,151 A | 12/1988 | Feld |
| 4,815,752 A | 3/1989 | Young et al. |
| 5,222,754 A | 6/1993 | Few |
| 5,375,867 A | 12/1994 | Kass et al. |
| 5,465,991 A | 11/1995 | Kass et al. |
| 5,516,140 A * | 5/1996 | Hinte ............... 280/494 |
| 5,562,298 A | 10/1996 | Kass et al. |
| 5,580,076 A | 12/1996 | DeRoule et al. |
| 5,628,525 A | 5/1997 | Kass et al. |
| 5,647,603 A * | 7/1997 | Kass et al. ........... 280/406.1 |
| 5,799,965 A | 9/1998 | Kass et al. |
| 5,868,414 A | 2/1999 | McCoy et al. |
| 5,890,726 A | 4/1999 | McCoy et al. |
| 5,984,341 A | 11/1999 | Kass et al. |
| 6,419,257 B1 * | 7/2002 | McCoy et al. ......... 280/455.1 |
| 6,746,036 B2 | 6/2004 | Adams |
| 6,860,501 B2 | 3/2005 | Schmidt et al. |
| 7,029,020 B2 | 4/2006 | Adams |
| 2006/0049612 A1 | 3/2006 | Anderson et al. |

\* cited by examiner

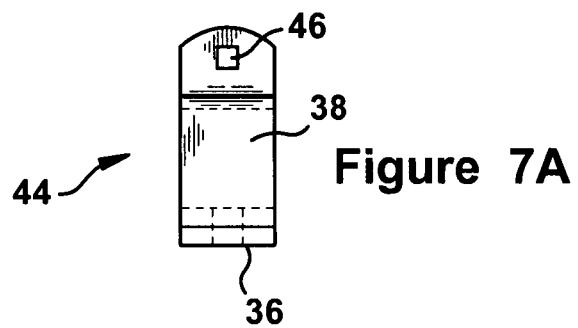
Figure 7A
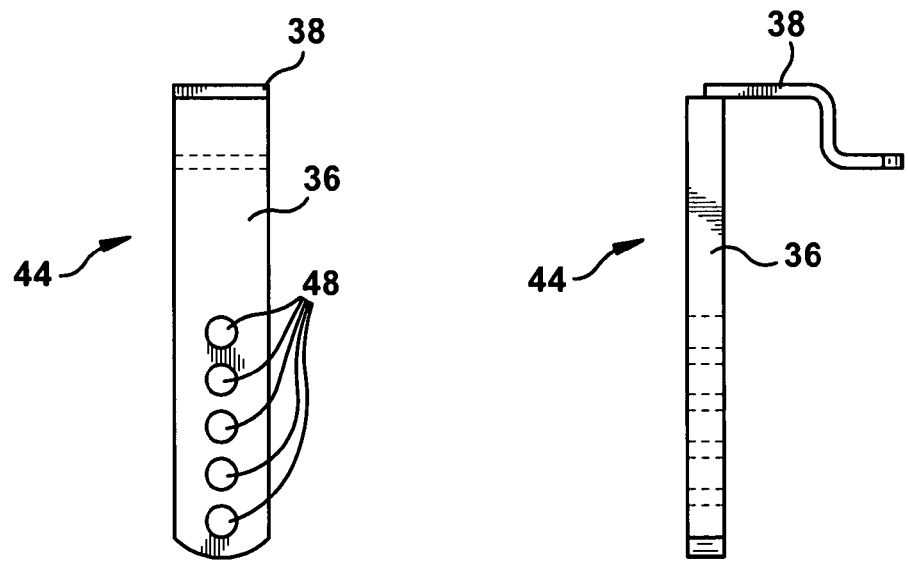
Figure 7B
Figure 7C
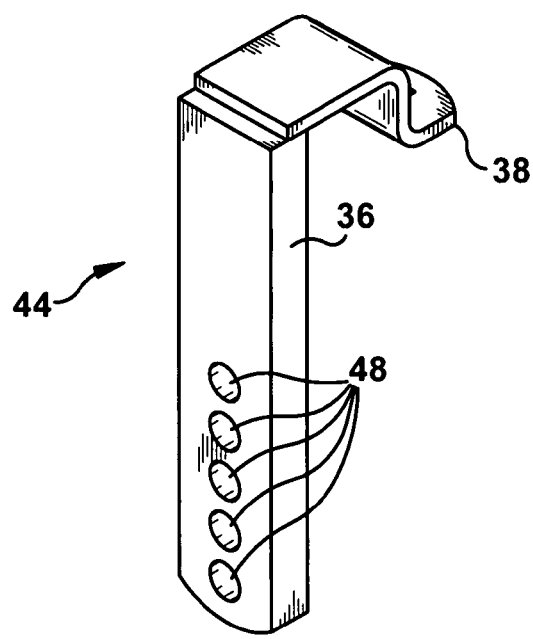
Figure 7D

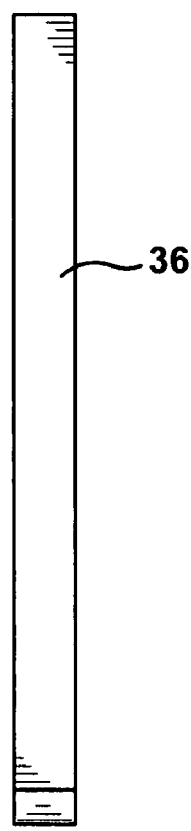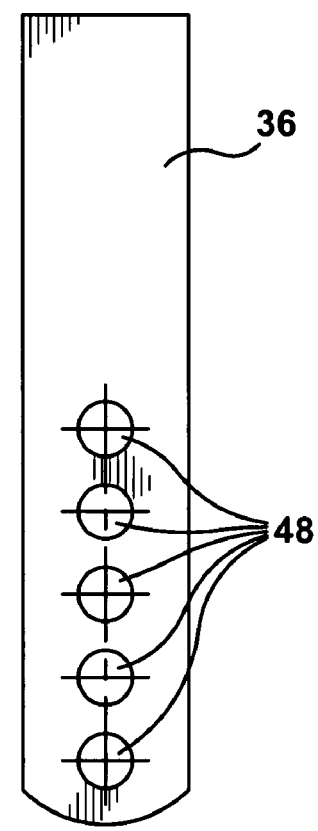
Figure 8A  Figure 8B
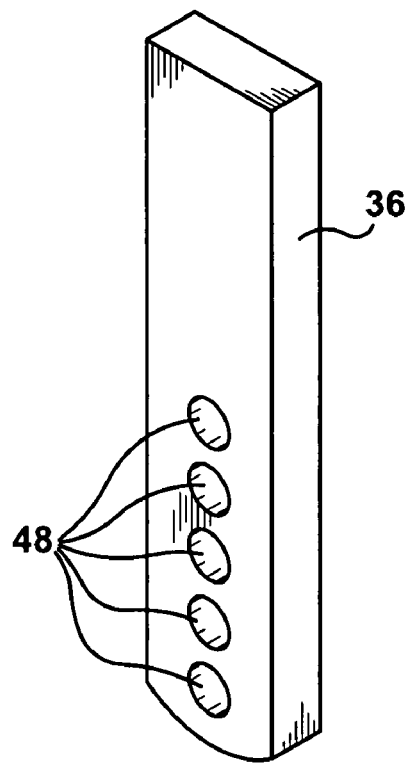
Figure 8C

APPARATUS AND METHODS FOR WEIGHT DISTRIBUTION AND SWAY CONTROL

CROSS-REFERENCE TO RELATED APPLICATIONS

This application claims priority from U.S. Provisional Patent Application No. 60/853,626, entitled "APPARATUS AND METHODS FOR WEIGHT DISTRIBUTION AND SWAY CONTROL" and filed on Oct. 23, 2006, which is hereby incorporated by reference in its entirety.

FIELD OF INVENTION

The present invention relates generally to apparatus, systems, and methods for attaching trailers to towing vehicles; more specifically, the present invention relates to novel and improved apparatus, systems, and methods for distributing weight of a trailer to a towing vehicle and controlling the sway of the trailer relative to the towing vehicle.

BACKGROUND

Many vehicles are designed to transport freight, goods, merchandise, personal property, and other such cargo. Often, such vehicles are arranged to tow a trailer by attaching the trailer to the towing vehicle though the use of a hitch assembly. For example, a hitch assembly may attach a trailer to a towing vehicle through a hitch ball and coupler arrangement that allows relative movement between the towing vehicle and the trailer as the towing vehicle makes turns, traverses uneven or rough terrain, and passes along inclining and declining roadways.

It is desirable to develop novel apparatus, systems, and methods for attaching a trailer to a towing vehicle. Such novel apparatus, systems, and methods may be directed to, for example, improving the operational safety of towing vehicles. Such novel apparatus, systems, and methods may also be directed to, for example, simplification of the apparatus, systems, and methods of attaching a trailer to a towing vehicle.

SUMMARY OF INVENTION

The present invention is directed to apparatus, systems, and methods for distributing the weight of a trailer to a towing vehicle and controlling the sway of that trailer relative to the towing vehicle. An embodiment of the present invention includes a spring arm coupled to the towing vehicle and an attachment mechanism for selectively placing the spring arm in mechanical communication with the trailer. The attachment mechanism includes a bracket assembly reversibly attachable to the trailer; a shoe bracket reversibly attachable to the bracket assembly; and a friction pad coupled to the shoe bracket.

DESCRIPTION OF THE DRAWINGS

In the accompanying drawings, which are incorporated in and constitute a part of this specification, embodiments of the invention are illustrated that, together with a general description of the invention given above and the detailed description given below, serve to illustrate the principles of this invention. The drawings and detailed description are not intended to and do not limit the scope of the invention or the claims in any way. Instead, the drawings and detailed description only describe embodiments of the invention, and other embodiments of the invention not described are encompassed by the claims.

FIGS. 7A, 7B, 7C, and 7D are a top view, a front view, a side view, and a perspective view, respectively, of a top and side bracket assembly of the weight distribution and sway control system of FIG. 1;

FIGS. 8A, 8B, and 8C are a side view, a front view, and a perspective view, respectively, of the side bracket of the weight distribution and sway control system of FIG. 1;

DETAILED DESCRIPTION OF THE INVENTION

Figure 1:
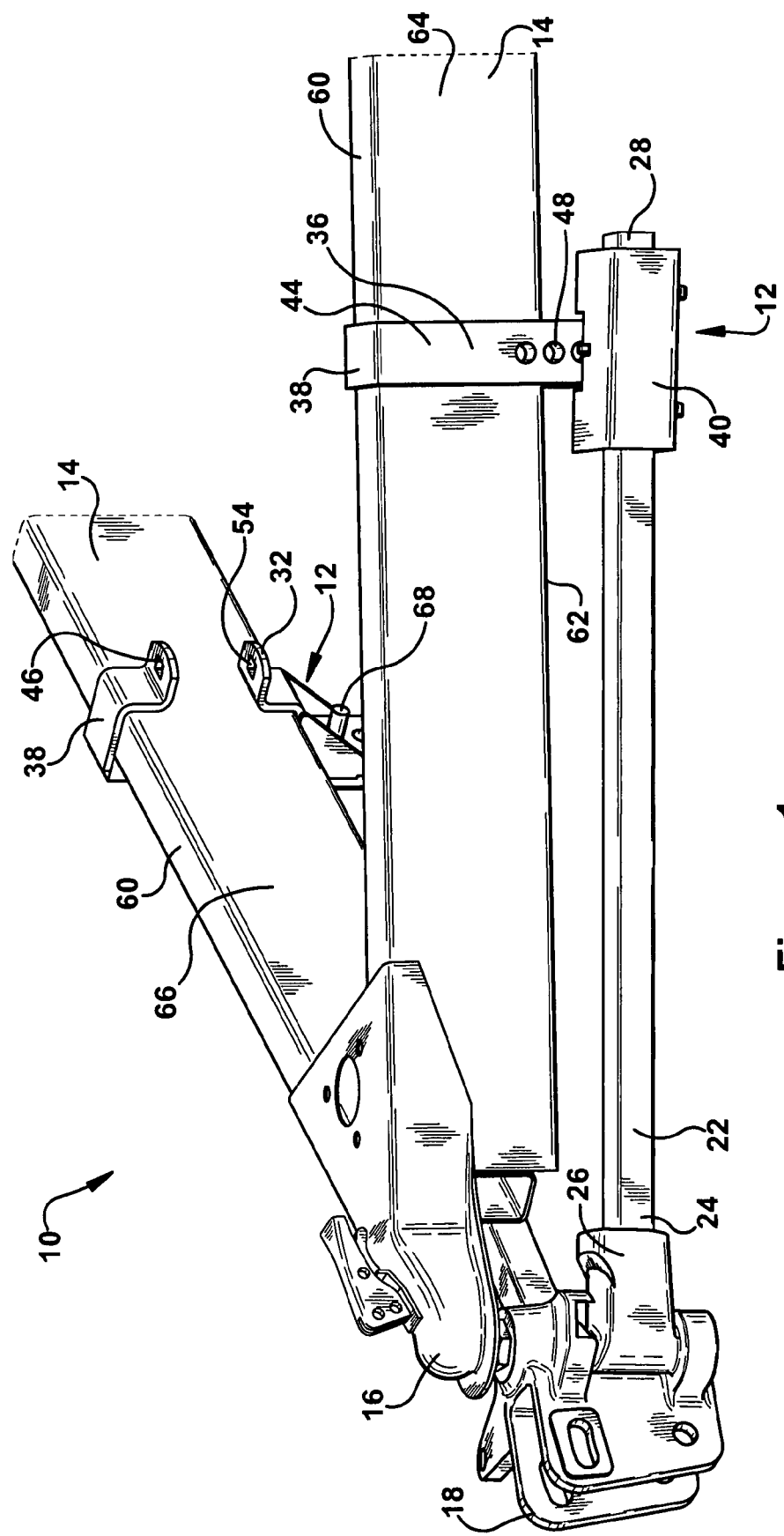
FIG. 1 illustrates a front perspective view of an embodiment of a system for distributing weight from a trailer to a towing vehicle and controlling the sway of the trailer relative to the towing vehicle.

The present application discloses apparatus, systems, and methods for distributing the weight of a trailer to a towing vehicle and controlling the sway of the trailer relative to the towing vehicle. Such apparatus, systems, and methods may couple, attach, or otherwise secure the trailer to the towing vehicle. The apparatus, systems, and methods disclosed herein distribute the weight of the trailer among the axles of the towing vehicle. In addition, the apparatus, systems, and methods disclosed herein control the sway of the trailer relative to the towing vehicle as the trailer is towed by the towing vehicle.

Even distribution of the weight of a trailer among the axles of the towing vehicle is important to the safe operation of a towing vehicle that is towing a trailer. Trailers are often loaded with heavy cargo and may substantially outweigh the towing vehicle. When such a trailer is coupled or secured to the rear of a towing vehicle, the majority of the weight of the trailer may be born by the rear axle of a towing vehicle. Such uneven weight distribution may lower the rear of the towing vehicle and raise the front of the towing vehicle. Under such conditions, the tires of the rear axle may bear substantially more weight than the tires of the front axle of the towing vehicle. Such an uneven distribution may cause the towing vehicle to experience ineffective steering or braking as the vehicle is driven. In extreme cases, the rear of the towing vehicle may contact and drag along the ground, especially as the vehicle traverses bumps, ruts, and other such uneven terrain.

Controlling the sway movement of the trailer (i.e., lateral or side-to-side movement of the trailer with respect to the towing vehicle) relative to the towing vehicle as the trailer is towed is also important to the safe operation of a towing vehicle. While relative motion of the trailer with respect to the towing vehicle is necessary to accommodate turns and inclining and declining roadways, excess sway of the trailer may lead to hazardous driving conditions. This may be particularly true when the load that is being towed is heavy relative to the weight of the towing vehicle. Excessive sway may cause the towing vehicle to lose effective steering or braking and may lead to accidents.

Many factors may contribute to the swaying of a trailer. For example, crosswinds impacting the trailer; unevenly loaded trailers; inclined, declined, and sloped roadways; winding roadways; and rough and uneven terrain may all contribute to swaying of the trailer. Such factors may be exacerbated as the speed of the vehicle increases. As previously mentioned, trailers and cargo may substantially outweigh a towing vehicle. When such a trailer begins to sway, particularly when driven at high speeds such as on a highway, the trailer may transfer sufficient side-to-side and lateral forces to the towing vehicle to cause the driver to lose control of the towing vehicle. Such conditions pose vast dangers for the driver of the towing vehicle, nearby pedestrians, and drivers of surrounding vehicles.

The embodiments of apparatus, systems, and methods disclosed and claimed herein may be directed to, but are not limited to, both distributing the weight of a trailer to the towing vehicle and controlling the sway of the trailer relative to the towing vehicle during the towing of the trailer. In addition, embodiments disclosed and claimed herein are directed to apparatus and methods for adjustably coupling the trailer to the towing vehicle. For example, in an embodiment, mechanisms for securing the trailer to the towing vehicle may be located at a variety of locations along the trailer. In another embodiment, the forces directed to controlling the sway of the trailer are adjustable by the methods used to couple the trailer to the towing vehicle.

FIGS. 1 through 6 illustrate an exemplary embodiment of a hitch assembly 10 for distributing weight and controlling the sway of a trailer attached to a towing vehicle. FIGS. 7 through 12 illustrate exemplary components of an attachment mechanism or assembly 12 for attaching the hitch assembly 10 to a trailer.

Figure 1A:
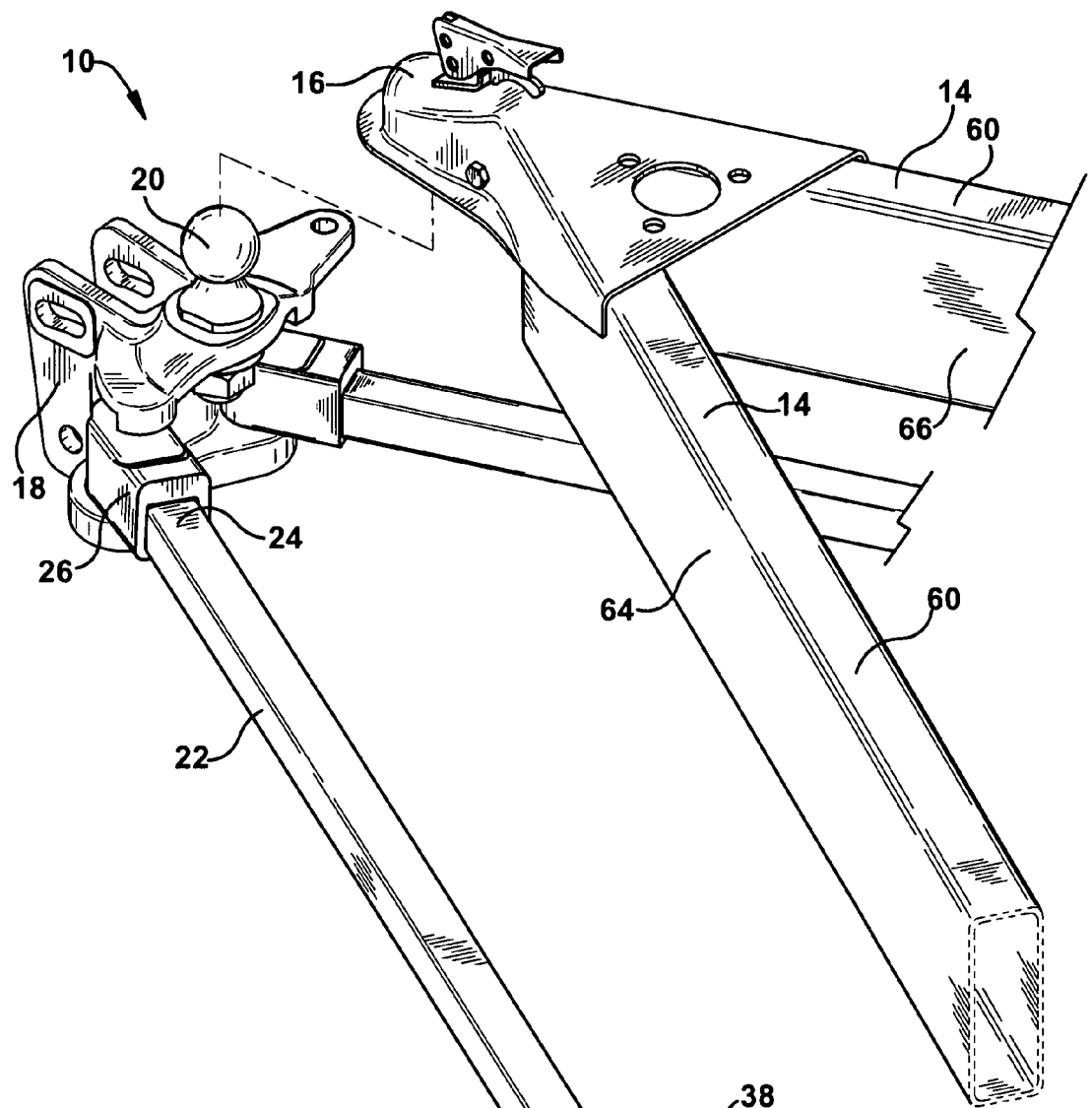
FIG. 1A is an exploded view of the weight distribution and sway control system of FIG. 1.
Figure 1A:
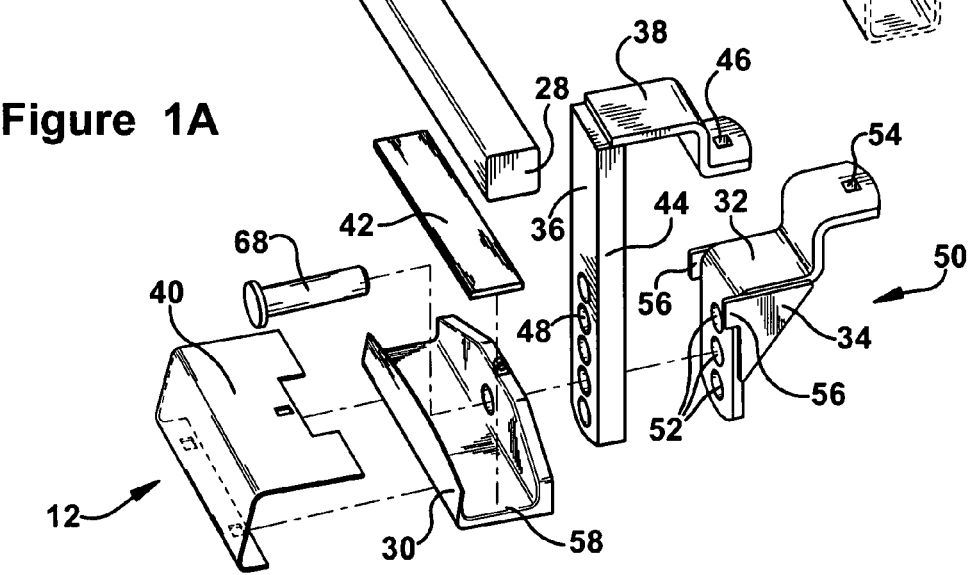
Figure 2:
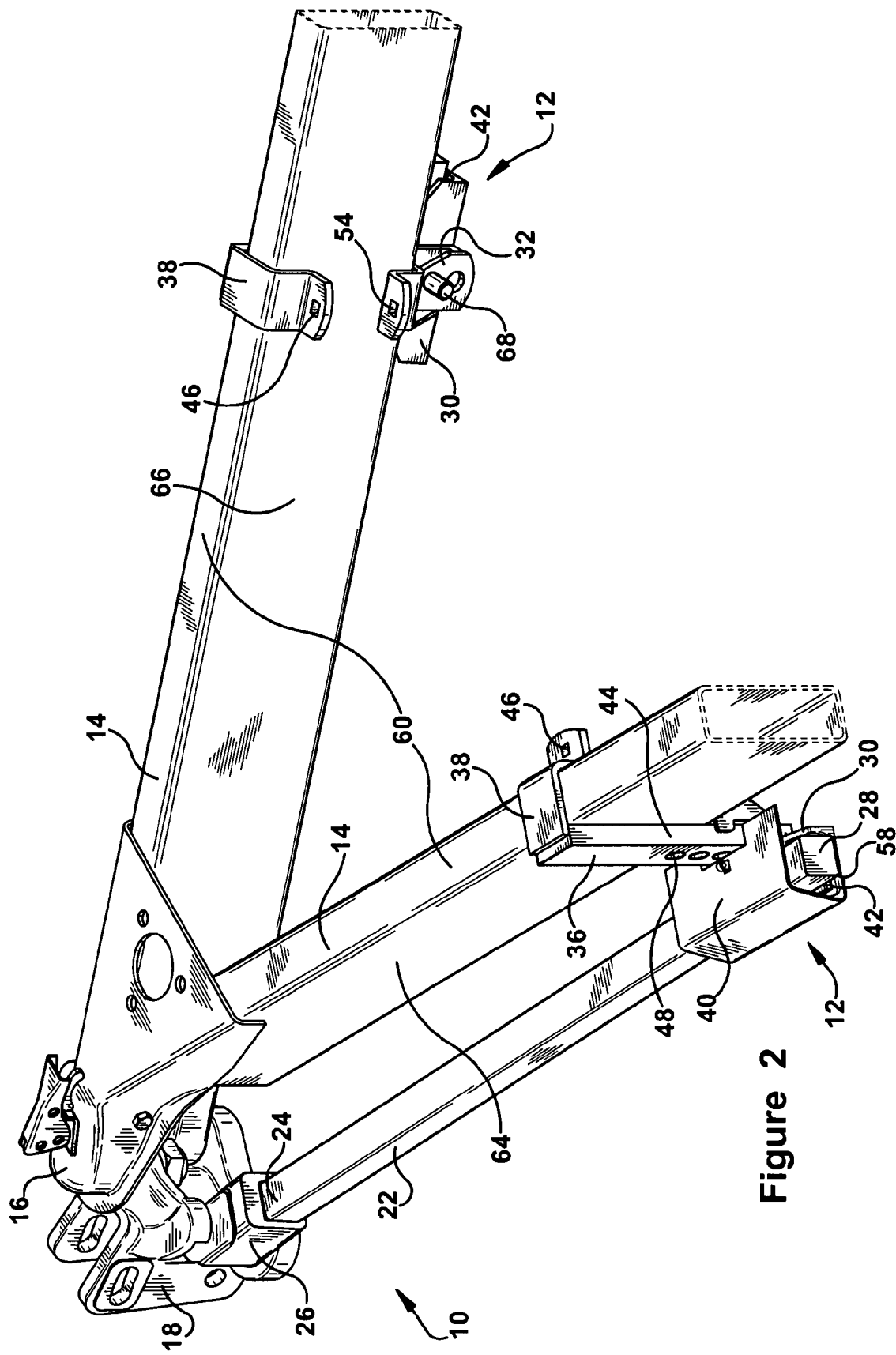
FIG. 2 is a rear perspective view of the weight distribution and sway control system of FIG. 1.

A trailer may be coupled, attached, or otherwise secured to a towing vehicle through a hitch ball and coupler arrangement. As best illustrated in FIGS. 1 and 2, a trailer includes an A-frame member 14, with a coupler 16 attached to the front end of the A-frame member 14. A ball mount head 18, which is attached to the towing vehicle (not shown), includes a hitch ball 20 (as best seen in FIG. 1A). The coupler 16 is positioned over the hitch ball 20 and secured with the hitch ball 20, thus securing the trailer to the towing vehicle.

The exemplary hitch assembly 10 as illustrated and described provides additional linkages between the A-frame member 14 of the trailer and the ball mount head 18 so as to distribute the weight of the trailer and control the sway of the trailer.

The exemplary embodiment of the hitch assembly 10 includes a pair of spring arms 22 and a pair of attachment assemblies 12. The pair of spring arms 22 are substantially similar. Only one reference number will be used for the pair of spring arms 22, and any illustration or description of a spring arm 22 will apply to either spring arm 22. The pair of attachment assemblies or mechanisms 12 are substantially similar. Only one reference number will be used for the pair of attachment assemblies 12, and any illustration or description of an attachment assembly 12 will apply to either attachment assembly 12. Although an exemplary embodiment is illustrated and described herein as having a pair of spring arms 12 and a pair of attachment assemblies 12, it will be readily understood by those skilled in the art that a hitch assembly may include greater of fewer than two spring arms and greater than or fewer than two attachment assemblies to attach those spring arms to a trailer.

A first end 24 of the spring arm 22 is engaged with a tubular member 26 coupled to the ball mount head 18. The tubular member 26 includes a mounting trunnion positioned within sockets defined by the ball mount head 18 so as to pivotably couple the tubular member 26, and thus the spring arm 22, to the ball mount head 18. Such an arrangement is presented in greater detail in U.S. Pat. No. 5,984,341, issued Nov. 16, 1999, to Kass et al., and entitled "Weight Distributing Hitch and Slide Bracket Assembly;" and U.S. Pat. No. 5,562,298, issued Oct. 8, 1996, to Kass et al., and entitled "Weight Distributing Hitch Assembly," the disclosures of which are fully incorporated herein by reference.

The attachment assembly 12 selectively attaches, couples, or otherwise secures a second or opposite end 28 of the spring arm 22 to the A-frame 14 of the trailer. As used herein, the term "coupled" means directly or indirectly attached, connected, or linked in a mechanical or other such manner. As best seen in FIG. 1A, the attachment assembly 12 includes a shoe bracket 30, a bottom bracket 32, a pair of gussets 34, a side bracket 36, a top bracket 38, a cover 40, and a friction pad 42. As will be described in detail below, the attachment assembly 12 selectively attaches or couples the spring arm 22 to the trailer such that the spring arm 22 assists in distributing the weight of the trailer to the towing vehicle and controlling the sway of the trailer relative to the vehicle. In addition, the spring arm 22 is attached or coupled to the trailer such that this attachment allows the trailer to move laterally with respect to the towing vehicle so as to accommodate operations such as turning the vehicle to the left and right; however, the arrangement also provides sufficient sway force resistance to dampen or eliminate sway as the towing vehicle tows the trailer.

Throughout this disclosure, embodiments are described as selectively attaching or coupling a spring arm 22 to the trailer with the attachment assembly 12. It will be readily appreciated that such selective attachment or coupling may be accomplished through the transfer of force between the components. For example, the spring arm 22 may be coupled to the trailer by the spring arm 22 applying a force to the trailer through the attachment mechanism 12. Such a force may be arranged to keep the spring arm 22 in contact with, and thus attached to, the attachment mechanism 12 throughout the operation of the towing vehicle. In other words, the spring arm 22 may be in mechanical contact with the trailer through the attachment mechanism 12 throughout the operation of the vehicle. In another embodiment, a force may be arranged to keep the spring arm 22 in contact with the attachment mechanism 12 throughout certain operations of the towing vehicle and may allow the spring arm 22 to break contact with the attachment mechanism 12 throughout other operations of the towing vehicle. In other words, the spring arm 22 may selectively be in mechanical contact with the trailer through the attachment mechanism 12 throughout the operation of the vehicle.

Figure 9A:
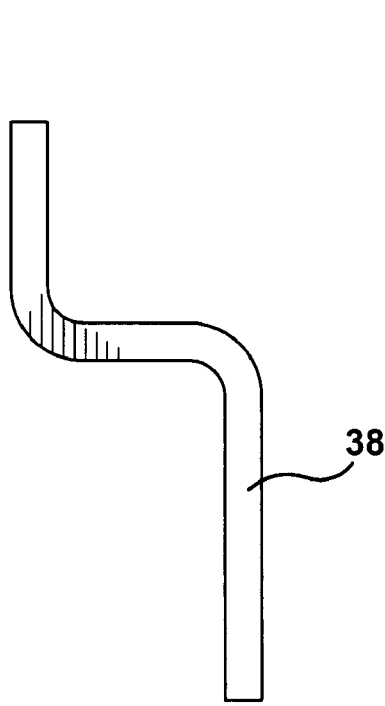
FIGS. 9A, 9B, and 9C are a side view, a front view, and a perspective view, respectively, of the top bracket of the weight distribution and sway control system of FIG. 1.
Figure 9B:
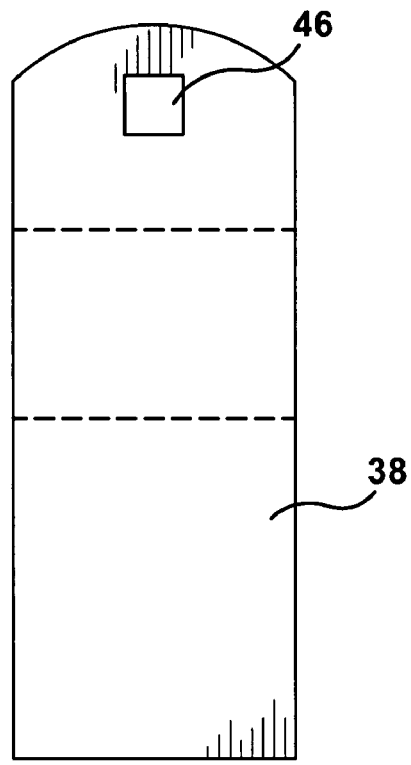
Figure 9C:
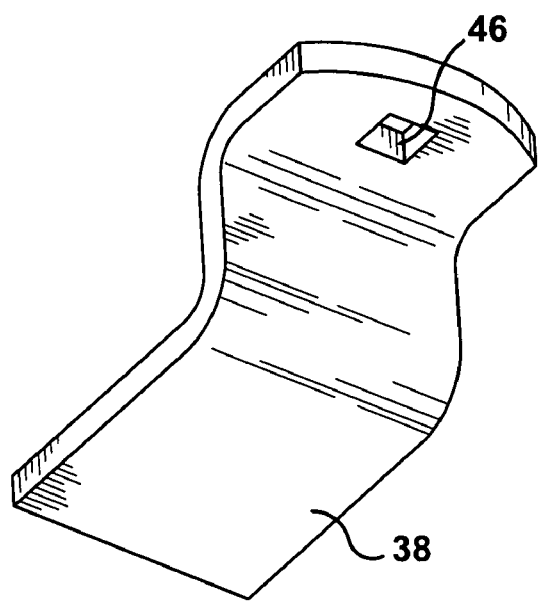
Figure 10A:
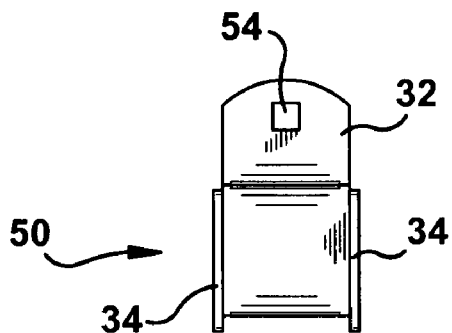
FIGS. 10A, 10B, 10C, and 10D are a top view, a front view, a side view, and a perspective view, respectively, of the bottom bracket and gusset assembly of the weight distribution and sway control system of FIG. 1.
Figure 10B:
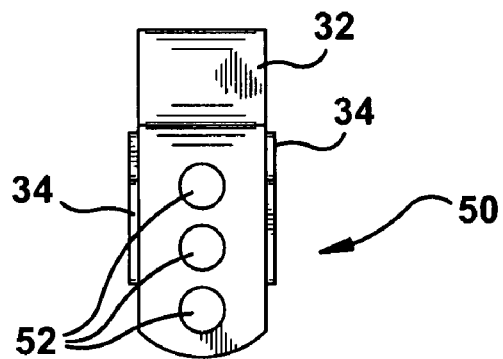
Figure 10C:
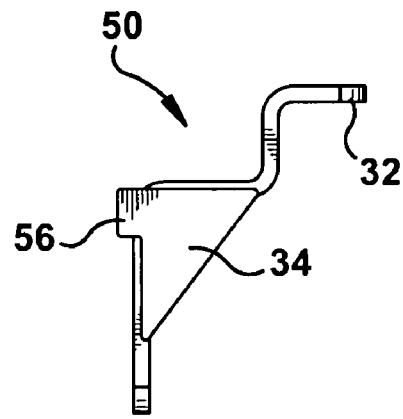
Figure 10D:
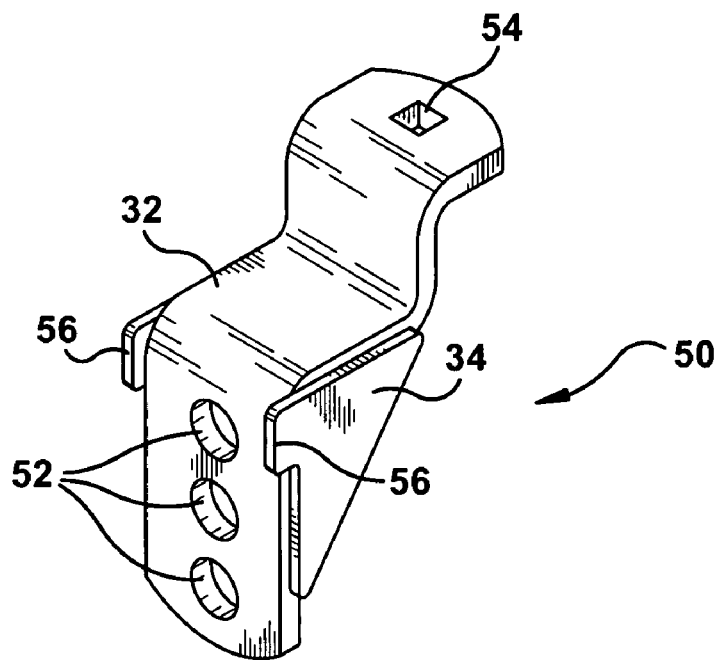

As seen in FIGS. 7 through 9, the top bracket 38 and the side bracket 36 may be coupled, through a weld or other such method of attachment, to form a generally L-shaped bracket assembly 44. Although the L-shaped bracket assembly 44 is shown as a coupling of two components, it will be readily understood by those skilled in the art that an L-shaped bracket may be integrally formed. The top bracket 38 includes an aperture 46 sized to accept a fastener, such as a bolt, rivet, or the like. The side bracket 36 includes a series of apertures 48 that are also sized to accept a fastener, such as a bolt, rivet, or the like.

Figure 11A:
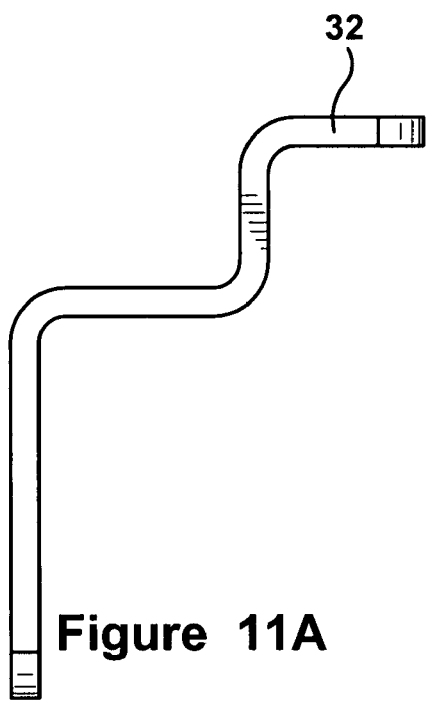
FIGS. 11A, 11B, and 11C are a side view, a front view, and a perspective view, respectively, of the bottom bracket of the weight distribution and sway control system of FIG. 1.
Figure 11B:
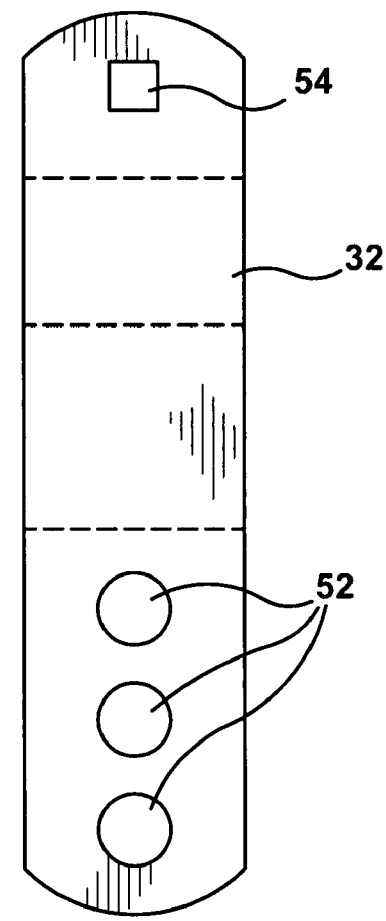
Figure 11C:
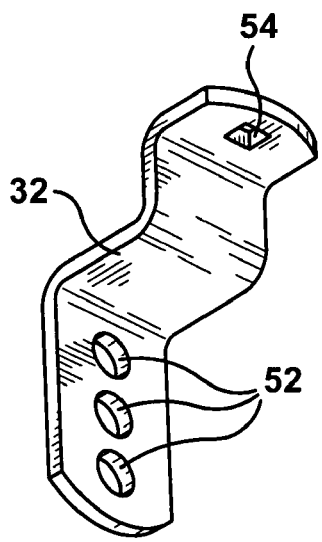
Figure 12A:
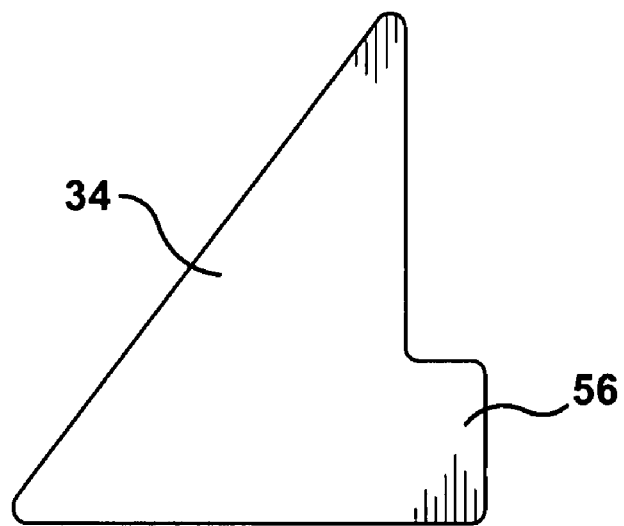
FIGS. 12A, 12B, and 12C are a side view, a front view, and a perspective view, respectively, of the gusset of the weight distribution and sway control system of FIG. 1.
Figure 12B:
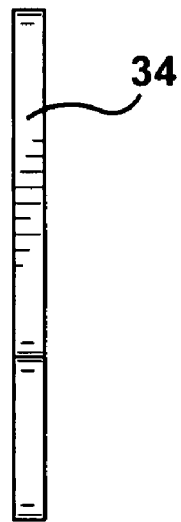
Figure 12C:
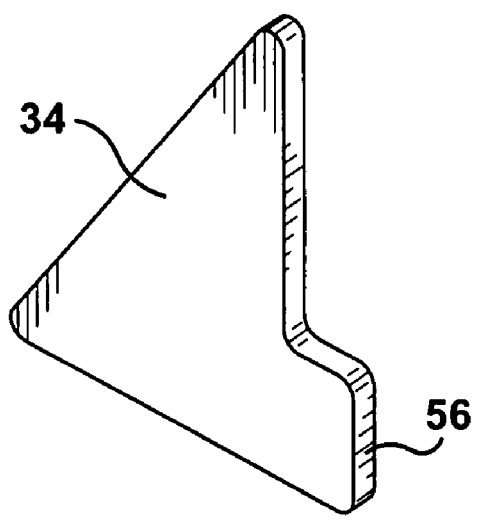

As seen in FIGS. 10 through 12, the bottom bracket 32 and gussets 34 are coupled, through a weld or other such method of attachment, to form a bottom bracket assembly 50. Although the bottom bracket assembly 50 is shown as a coupling of two components, it will be readily understood by those skilled in the art that a bottom bracket assembly may be integrally formed. The bottom bracket 32 includes a series of apertures 52 sized to accommodate a fastener, such as a bolt, rivet, or the like, and is arranged such that at least one aperture 52 of the bottom bracket 32 mates with at least on of the apertures 48 of the side bracket 36. Fasteners can be passed through mated apertures 48, 52 to couple the bottom 32 and side 36 brackets together. The bottom bracket 32 also includes an aperture 54 sized to accept a fastener, such as a bolt, rivet, or the like, and arranged to align with the aperture 46 of the top bracket 38 so as to secure the attachment assembly 12 to the A-frame 14 of the trailer. The gusset 34 includes a triangular-shaped body with a pair of tabs 56 extending from the body.

The shoe bracket 30 is generally U-shaped and includes an aperture (not shown) sized to accommodate a fastener, such as a bolt, rivet, or the like, and arranged to mate with the apertures 52, 48 of the bottom bracket 32 and side bracket 36. Fasteners can be passed through the mated apertures of the shoe 30, bottom 32, and side 36 brackets so as to couple the brackets 30, 32, 36 together. The friction pad 42 is positioned or coupled to a flat inner surface 58 of the shoe bracket 30. The friction pad 42 as illustrated is comprised of cork material. Although the friction pad 42 is described as being comprised of cork material, those skilled in the art will readily appreciate that a friction pad may be comprised of any material that may resist the movement of components in contact with the friction pad.

Figure 3A:
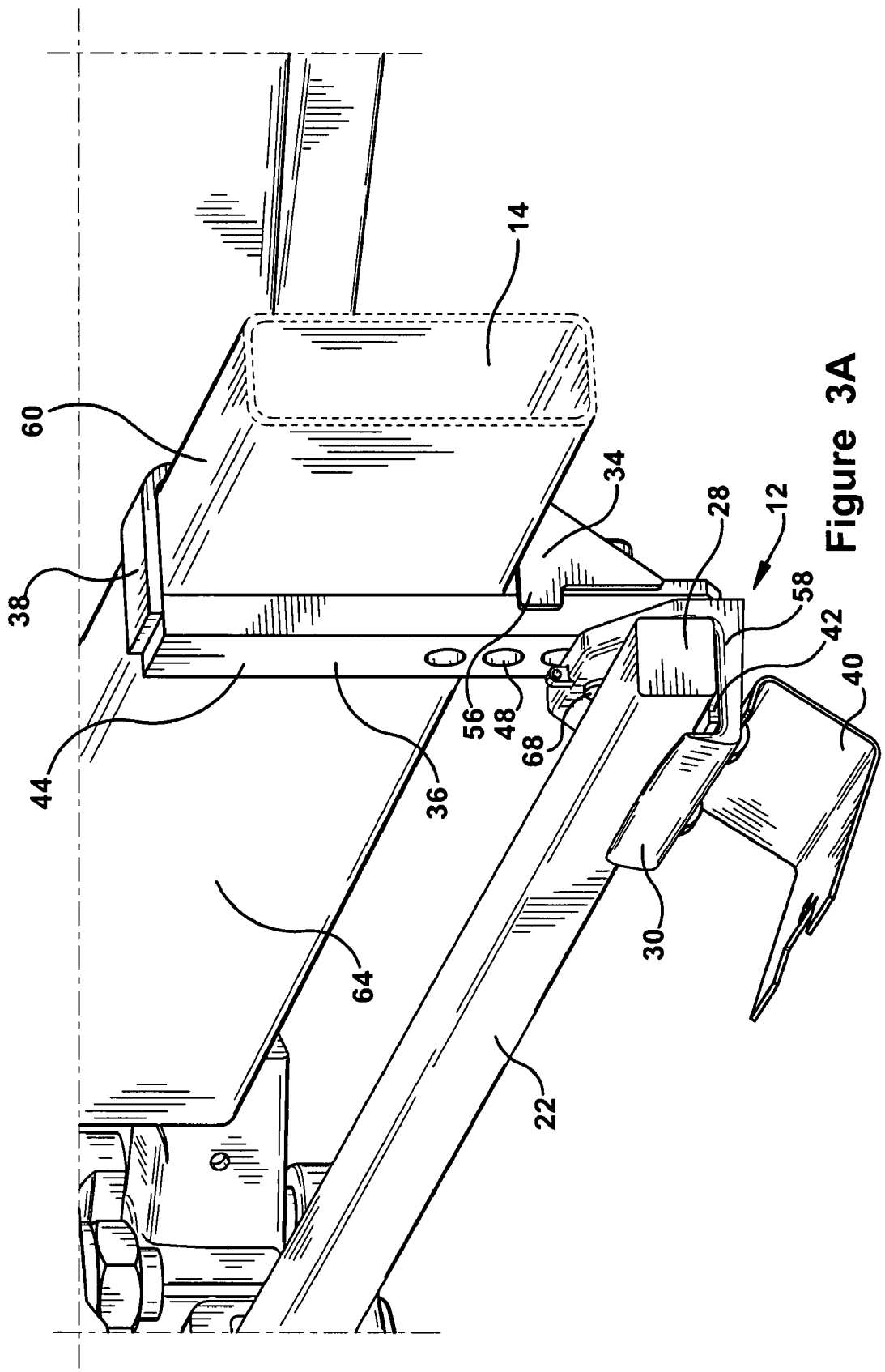
FIGS. 3A and 3B are detailed perspective views of an attachment mechanism of the weight distribution and sway control system of FIG. 1.
Figure 3B:
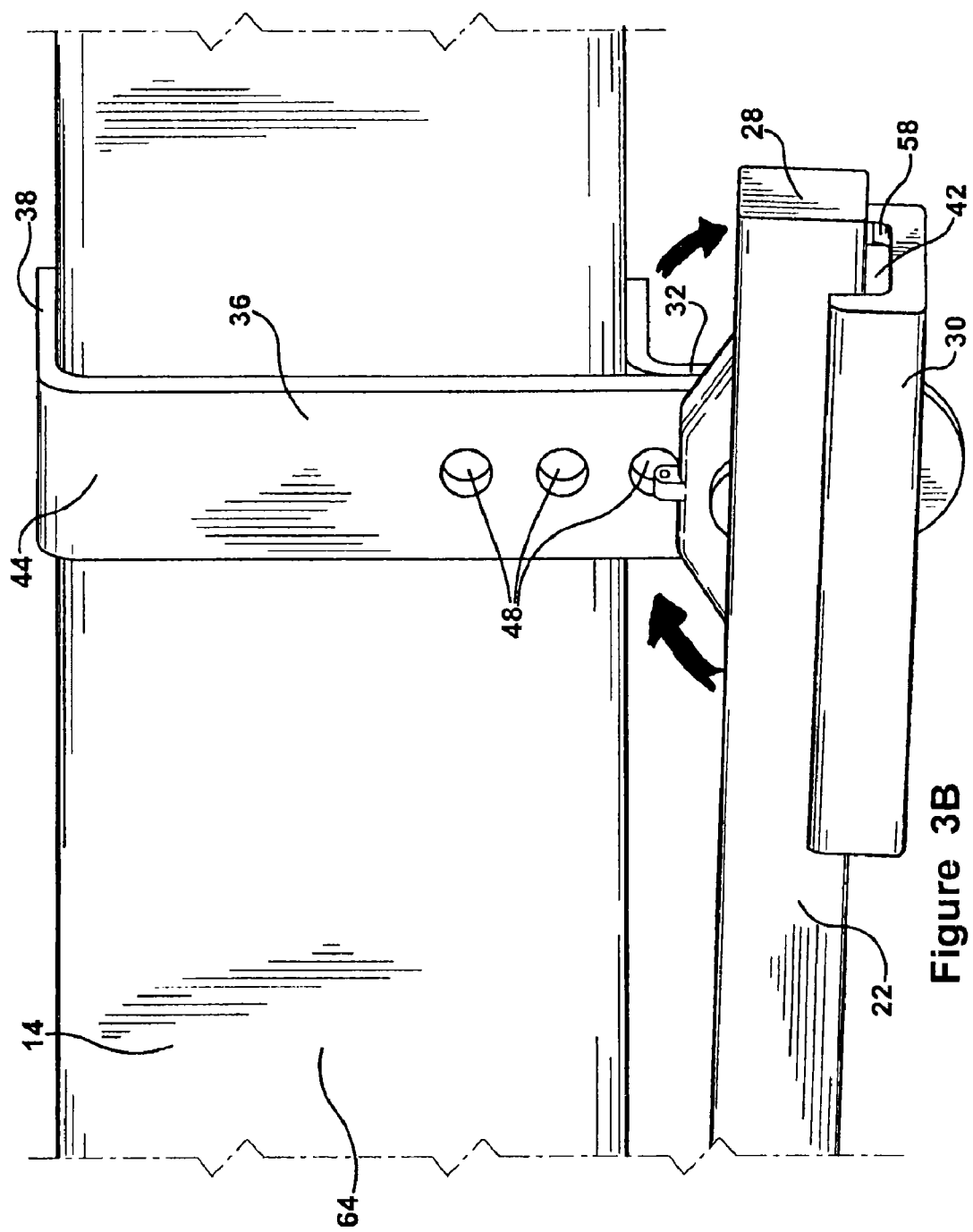
Figure 4:
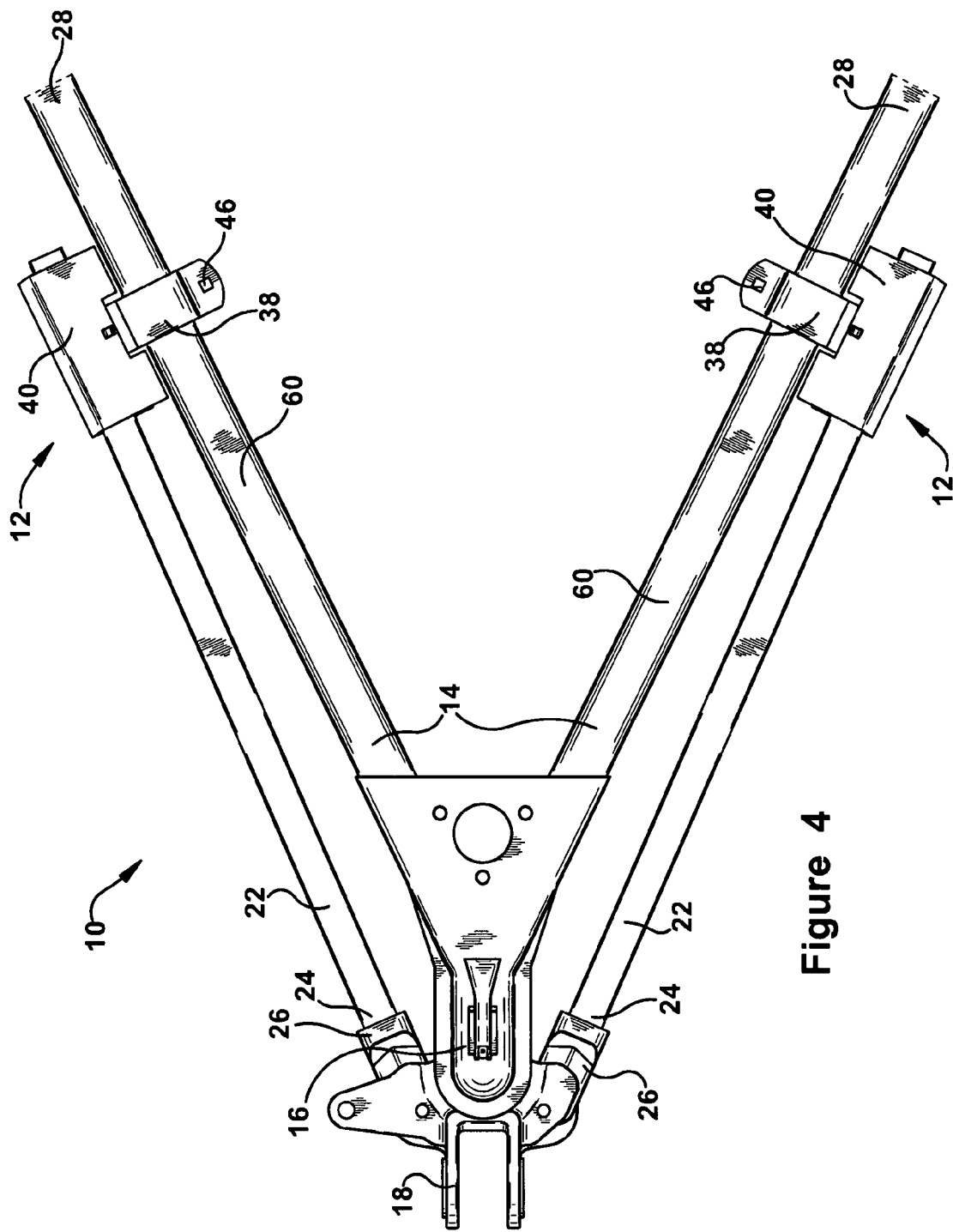
FIG. 4 is a top view of the weight distribution and sway control system of FIG. 1.
Figure 5:
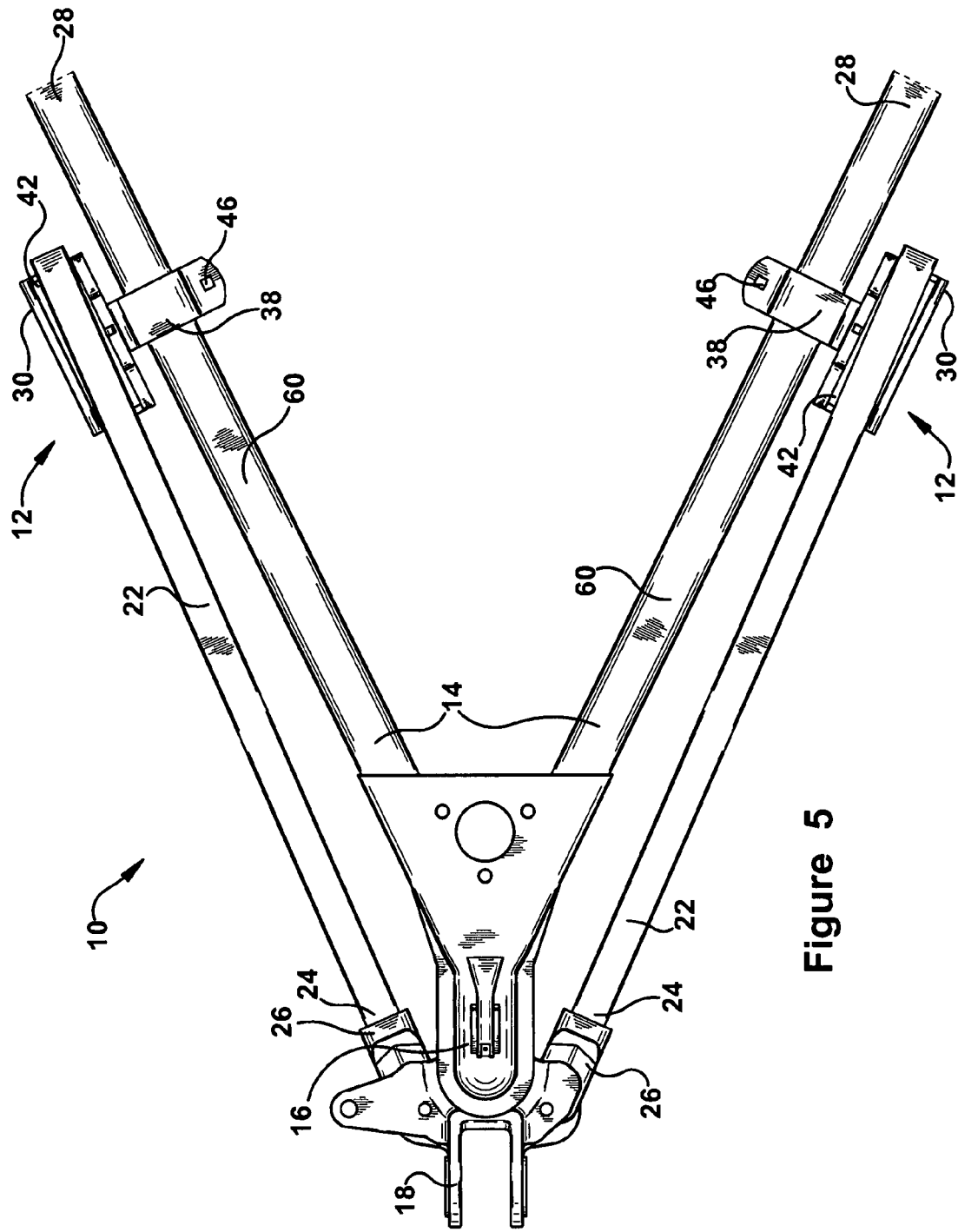
FIG. 5 is a top view of the weight distribution and sway control system of FIG. 1 with a cover removed from the attachment mechanism.
Figure 6:
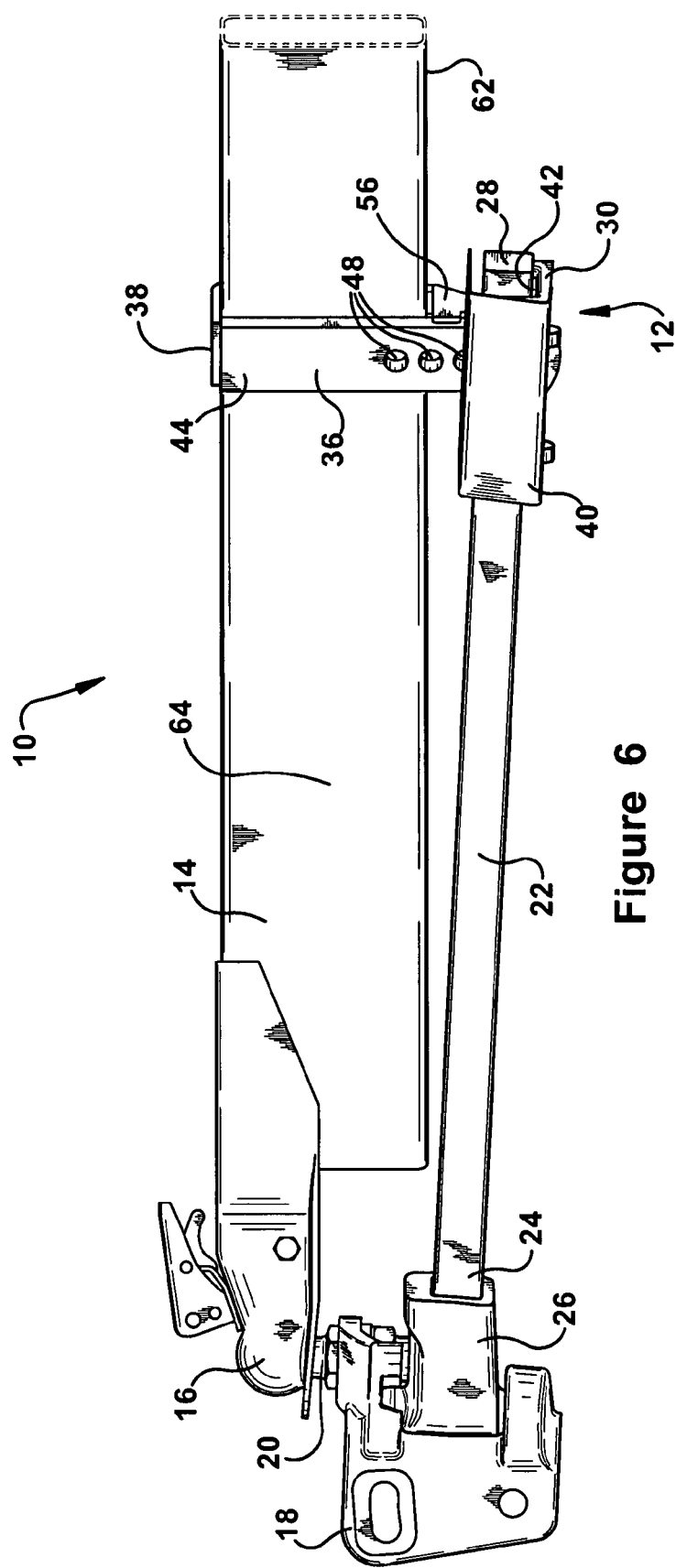
FIG. 6 is a side view of the weight distribution and sway control system of FIG. 1.

As illustrated in FIGS. 1 though 6, in one embodiment, the attachment assembly 12 may be attached to the A-frame member 14 of the trailer as follows: The L-shaped bracket 44 is placed over a top surface 60 of the A-frame member 14. The bottom bracket assembly 50 is positioned under the A-frame member 14 and is in contact with a bottom surface 62 of the A-frame 14. The L-shaped bracket 44 is overlaid onto the bottom bracket assembly 50 such that the apertures 48 of the side bracket 36 are aligned with the apertures 52 of the bottom bracket 32. The series of apertures 48, 52 on both the side bracket 36 and the bottom bracket 32, respectively, allow for the assembly 12 to be attached to A-frame members 14 of varying heights. The gusset tabs 56 are positioned to either side of the side bracket 36 (as best seen in FIG. 3A) to increase stability of the attachment assembly 12. The tabs 56 resist the rotation of the side bracket 36 relative to the bottom bracket 32 when forces are applied to the side bracket 36.

The shoe bracket 30 is positioned against the L-shaped bracket 44 such that the aperture of the shoe 30 is also aligned with the apertures 48, 52 of the side bracket 36 and bottom bracket 32. In an embodiment, a fastener 68 (as seen in FIG. 1A), such as a threaded bolt, is passed through the aligned apertures and is secured by a threaded nut so as to couple the brackets 30, 32, 36 together about the A-frame member 14. When the bottom 32 and side 36 brackets are aligned, two or more of the series of apertures 48, 52 in the side bracket 36 and bottom bracket 32 may align. Such an arrangement may optionally allow for variation of the height of the shoe bracket 30 by enabling an operator or installer to selectively choose to align the aperture of the shoe bracket 30 with higher or lower aligned apertures 48, 52 in the side bracket 36 and bottom bracket 32.

The fastener may be optionally fitted with a sleeve (not shown) that aligns with the aperture of the shoe bracket 30. Such a sleeve enhances the ability of the shoe bracket 30 to rotate with respect to a central axis of the fastener 68. Such rotation allows the shoe bracket 30, and the friction pad 42 coupled to the inner flat surface 58 of the shoe bracket 30, to be variably positioned with respect to the attachment assembly 12 and the A-frame member 14. As will be described below, this variable positioning of the shoe bracket 30 enhances the sway control of the hitch assembly 10.

The arrangement of the brackets, as described above and best shown in FIG. 2, aligns the apertures 46, 54 of the top bracket 38 and bottom bracket 32. A second fastener (not shown) is passed through the apertures 46, 54 to further secure the attachment assembly 12 to the A-frame member 14. Such a described embodiment provides an attachment mechanism 12 that is simple and straightforward to install. No specialized tools or manual skills are needed to attached the hitch assembly 10 to the trailer. In addition, the embodiments as described and illustrated herein allow for attaching the attachment assembly 12 to A-frames of varying heights and sizes. Such flexibility allows for adjustments to account for the thickness of the plastic shrouds that are commonly used to protect trailers and often reduces or eliminates the need to modify a shroud to enable the attachment assembly 12 to be secured to the trailer.

Once the attachment assembly 12 is secured to the A-frame member 14, each spring arm 22 may be positioned within a shoe bracket 30. To provide weight distribution and sway control, the spring arm 22 is preloaded by bending the arm 22 upward, through the use of a jack or other such method, before the arm 22 is placed in the shoe bracket 30. When the spring arm 22 is positioned within the shoe bracket 30, the arm 22 is generally in direct contact with the friction pad 42. The preload force results in the spring arm 22 applying a downward force on the trailer through the attachment assembly 12 and an upward force on the rear of the vehicle through the ball mount head 18. The magnitude of the preload force may be selected to enhance the safe operation of the towing vehicle by considering factors such as, for example, the relative weights of the cargo and trailer and the anticipated driving conditions.

The downward force of the spring arm 22 is relayed to the trailer by the contact of the spring arm 22 with the friction pad 42, which is coupled to the shoe bracket 30. Such a downward force assists in the distribution of the weight of the trailer to the towing vehicle. The downward force, together with the friction coefficient of the friction pad 42, produces a friction force that resists lateral and front-to-back movement of the spring arm 22 relative to the attachment assembly 12 and the trailer. Such resistance assists in controlling the sway of the trailer relative to the towing vehicle.

Once the spring arm 22 is positioned within the shoe bracket 30, the cover 40 is optionally secured to the shoe bracket 30. The cover 40 may be arranged to further secure the spring arm 22 in the shoe bracket 30. The side walls of the shoe bracket 30 and the downward force of the spring arm 22 are normally sufficient to secure the arm 22 within the shoe bracket 30; however, the addition of the cover 40 may further increase the safe use of the hitch assembly 10 by further securing the arm 22 within the shoe bracket 30, particularly as the trailer traverses a bump or rut at a high rate of speed or when the towing vehicle is negotiating a tight turn. Conditions such as negotiating bumps at a high speed and tight turns may cause the spring arm 22 to momentarily lose contact with the friction pad 42, thus, resulting in the selective attachment of the arm 22 to the trailer as previously discussed.

The arrangement of the friction pad 42 may substantially improve the sway control of the trailer during towing of the trailer. As mentioned earlier, the inclusion of a friction pad 42 creates a friction force to resist lateral and front-to-back movement of the spring arm 22 during towing of a trailer. Such a force may be arranged such that the force does not interfere with the intended operations of the towing vehicle, such as controlled left and right turning, backing up, etc.; however, the force does dampen or counteract the sway forces encountered during driving of the vehicle so as to reduce or eliminate the sway movement of the trailer.

The embodiments as shown and described allow for a user to selectively control the friction force applied to spring arm 22 and, thus, control the amount of sway control provided by the hitch assembly 10. In one example, the preload force of the spring arm 22 may be increased, which will increase the sway control provided by the hitch assembly 10. Conversely, the preload force on the spring arm 22 may be decreased, which will decrease the sway control provided by the hitch assembly 10. Often, the conditions that demand a greater preload force on the spring arm 22 also demand greater sway control. For example, as the weight of cargo increases, the preferred preload force on the spring arm 22 may increase to distribute more load to the front of the towing vehicle. Similarly, as the weight of cargo increases, the magnitudes of the sway forces may also increase; therefore, increases in sway control are beneficial.

In the embodiments described and illustrated, when the preload force is increased, the downward force of the spring arm 22 on the friction pad 42 increases. The increased downward force increases the friction force that must be overcome for the arm 22 to move laterally or front-to-back, which provides greater control of sway by dampening and counteracting greater sway forces. The preload force may be increased or decreased in a number of ways. In one example, the height of the shoe bracket 30 relative to the trailer may be adjusted based on specific aligned apertures 48, 52 of the side bracket 36 and bottom bracket 32, through which the shoe bracket 30 is attached. As may be seen in FIG. 1, there are multiple aligned apertures 48, 52 through which the shoe bracket 30 may be attached. The higher the attachment of the shoe bracket 30, the greater the spring arm 22 must be bent upwards to be placed within the shoe bracket 30, thus the greater the resulting preload force of the arm 22. Conversely, the lower the attachment of the shoe bracket 30, the less the spring arm 22 must be bent upwards to be placed within the shoe bracket 30, thus the smaller the resulting preload force of the arm 22.

In another example, the attachment assembly 12 may be selectively positioned along the length of the A-frame 14. As will be readily appreciated, as the attachment assembly 12 is moved towards the ball mount head 18 (i.e., closer to the first end 24 of the spring arm 22 and farther away from the second end 28 of the spring arm 22), the spring arm 22 must be bent upward a greater distance to be properly seated in the shoe bracket 30. The larger the upward deflection of the spring arm 22, the larger the sway control provided by the hitch assembly 10. Conversely, as the attachment assembly 12 is moved away from the ball mount head 18 (i.e., closer to the second end 28 of the spring arm 22 and farther from the first end 24 of the spring arm 22), the spring arm 22 may be bent upward a lesser distance to be properly seated in the shoe bracket 30. The lesser the upward deflection of the spring arm 22, the lesser the sway control provided by the hitch assembly 10.

In yet another example of a method of controlling the amount of sway control provided by the hitch assembly 10, the spring arms 22 may be selected based on the stiffness or rigidity of the material comprising the arms 22. As will be readily understood, at a given deflection, the preload force provided by the arms 22 will vary based on the stiffness or rigidity of the spring arm material. A spring arm comprised of a stiffer material will provide a greater preload force at a given deflection than a spring arm comprised of a more flexible or pliant material.

It will be readily understood that examples of apparatus, systems, and methods described and illustrated herein for increasing or decreasing sway control may also be applied to increase or decrease the distribution of the weight from a trailer to a towing vehicle.

The methods and arrangements of securing the attachment mechanism 12 to the A-frame member 14 described and illustrated herein provide for a robust coupling of the attachment assembly 12 to the trailer. As opposed to relying on a few points of contact between the assembly 12 and A-frame 14, the described embodiments provide for surface-to-surface contact between the assembly 12 and the A-frame 14. The brackets 32, 36, 38 are arranged such that there is surface-to-surface contact between the attachment mechanism 12 and all four sides of the A-frame member 14. The top bracket 38 engages the top surface 60 of the A-frame 14 in surface-to-surface contact, and the bottom bracket 32 engages the bottom surface 62 of the A-frame 14 in surface-to-surface contact. In addition, the side bracket 36 engages a first side surface 64 of the A-frame 14 in surface-to-surface contact, and the top bracket 38 and bottom brackets 32 engage a second side surface 66 of the A-frame 14 in surface-to-surface contract.

The placement and tightening of fasteners through the apertures 46, 48, 52, 54 of the brackets causes the side bracket 36 and portions of the top bracket 38 and bottom bracket 32 to draw in towards the side surfaces 64, 66 of the A-frame 14, thus enhancing the surface-to-surface contact between the brackets 32, 36, 38 and sides 64, 66 of the A-frame member 14. Such an arrangement provides clamping forces on all four surfaces 60, 62, 64, 66 of the A-frame 14, which provides for a more reliable and durable coupling of the hitch assembly 10 to the trailer.

The method of coupling of the shoe bracket 30 in the attachment mechanism 12 may also enhance the sway control of the hitch assembly 10. The shoe bracket 30 may be arranged such that it may pivot about the fastener. This pivotablity is further enhanced by the optional inclusion of a sleeve (not shown), as described above. The sway control of the trailer is, in part, reliant on the spring arm 22 being in surface-to-surface contact with the friction pad 42. As the towing vehicle tows a trailer the elevation and angle of the trailer with respect to the towing vehicle, may vary, particularly as the vehicle traverses uneven or rough terrain or inclining or declining roadways. Allowing the shoe bracket 30 to rotate may account for the changing elevations or angles of the trailer with respect to the towing vehicle. The shoe bracket 30 may rotate about the fastener as the trailer raises, lowers, or tilts to maintain surface-to-surface contact between the spring arm 22 and the friction pad 42. Such an arrangement may maintain a constant level of sway control, regardless of the position of the trailer with respect to the towing vehicle.

As described above, the position of the attachment mechanism 12 along the A-frame 14 is variable, which may accommodate a variety of circumstances. The style of trailer and placement of cargo may limit the locations along the A-frame member 14 at which a hitch assembly may be coupled. For example, trailers that are designed to transport gas tanks often include securing fixtures along the perimeter of the trailer. These securing fixtures and the placement of gas tanks in the fixtures often interfere with the placement of spring arm attachment mechanisms at locations along the A-frame. If the attachment mechanism is statically located along the spring arm, such a condition may preclude a hitch assembly from being used with a trailer transporting gas tanks.

In the embodiments described and illustrated herein, the attachment assembly 12 may be secured anywhere along the A-frame member 14 and still accommodate the spring arm 22. When the spring arm 22 is placed on the friction pad 42, it is free to move (once frictional forces between the friction pad 42 and the spring arm 22 are overcome) within an enclosure defined by the shoe bracket 30 and cover 40. Such placement of the spring arm 22 on the friction pad 42 is not dependent on the location of the attachment assembly 12 to the A-frame 14.

Although preferred embodiments of the present invention have been illustrated in the accompanying drawings and described in the foregoing detailed description, it is to be understood that the present invention is not to be limited to just the preferred embodiments disclosed, but that the invention described herein is capable of numerous rearrangements, modifications, and substitutions without departing from the scope of the claims hereafter.

Having thus described the invention, we claim:

1. A system for distributing the weight of a trailer to a towing vehicle and controlling the sway of the trailer relative to the towing vehicle, the system comprising:
    a spring arm coupled to the towing vehicle; and
    an attachment mechanism for selectively placing the spring arm in mechanical communication with the trailer, the attachment mechanism comprising:
        a bracket assembly attachable to the trailer a side bracket having a first plurality of apertures therein, a bottom bracket having a second plurality of apertures selectively alignable with the first plurality of apertures, and a fastener connecting one of the first plurality of apertures to one of the second plurality of apertures to selectively connect the side bracket to the bottom bracket;
        a shoe bracket attachable to the bracket assembly; and
        a friction pad rigidly coupled to the shoe bracket, wherein the friction pad remains vertically stationary relative to the shoe bracket during operation.

2. The system of claim 1, wherein the spring arm is selectively in contact with the friction pad.

3. The system of claim 2, wherein the spring arm is in mechanical communication with the trailer through a force applied to the friction pad by the spring arm.

4. The system of claim 1, wherein the shoe bracket includes an aperture.

5. The system of claim 4, wherein the shoe bracket is attachable to the bracket assembly by the fastener being selectively passed through the first or second plurality of apertures of the bracket assembly and the aperture of the shoe bracket.

6. The system of claim 5, wherein the shoe bracket is attachable to the bracket assembly at a plurality of locations along the bracket assembly.

7. The system of claim 1, wherein the shoe bracket may selectively be secured to the side bracket and bottom bracket at a plurality of locations.

8. The system of claim 7, further comprising a cover selectively attachable to the shoe bracket while the spring arm is supported by the shoe bracket.

9. The system of claim 1, wherein the shoe bracket includes a third aperture and the fastener may be selectively passed through the first aperture, the second aperture, and the third aperture to secure the shoe bracket to the side bracket and the bottom bracket.

10. The system of claim 9, wherein the shoe bracket may rotate about the fastener.

11. The system of claim 1, wherein the attachment mechanism is securable to the trailer at a plurality of locations along the trailer.

12. The system of claim 1, wherein a first surface of the bracket assembly is in contact with a top surface of the trailer, a second surface of the bracket assembly is in contact with a bottom surface of the trailer, a third surface of the bracket assembly is in contact with a first side surface of the trailer, and a fourth surface of the bracket assembly is in contact with a second side surface of the trailer when the bracket assembly is attached to the trailer.

13. The system of claim 1, wherein the bracket assembly further comprises a top bracket connected to the side bracket.

14. A method of distributing the weight of a trailer to a towing vehicle and controlling the sway of the trailer relative to the towing vehicle, the method comprising:
    coupling a spring arm to the towing vehicle;
    selectively placing the spring arm in mechanical communication with the trailer via an attachment mechanism, wherein the attachment mechanism includes a bracket assembly attachable to the trailer and a shoe bracket attachable to the bracket assembly, wherein the bracket assembly comprises a top bracket, a side bracket connected to the top bracket, the side bracket having a first plurality of apertures therein, and a bottom bracket having a second plurality of apertures selectively alignable with the first plurality of apertures;
    connecting one of the first plurality of apertures to one of the second plurality of apertures via a fastener to selectively connect the side bracket to the bottom bracket;
    coupling a friction pad to the shoe bracket; and
    substantially horizontally pivoting the shoe bracket about the fastener as the spring arm moves relative to trailer.

15. The method of claim 14, wherein the attachment mechanism is selectively attachable to the shoe bracket.

16. A system for distributing the weight of a trailer to a towing vehicle and controlling sway of the trailer relative to the towing vehicle, the system comprising:
    a spring arm coupled to the towing vehicle;
    a bracket assembly attachable to the trailer comprising a side bracket and a bottom bracket;
    a fastener connecting the side bracket to the bottom bracket;
    a shoe bracket attachable to the bracket assembly; and
    a sleeve located around the fastener, wherein the sleeve facilitates substantially horizontal pivoting of the shoe bracket about a central axis of the fastener.

17. The system of claim 16, wherein the sleeve is aligned with an aperture of the shoe bracket.

18. The system of claim 16, wherein the pivoting about the central axis permits the shoe bracket to be variably positioned to maintain contact with the spring arm to enhance the sway control of the trailer.

* * * * *